US012467789B2

(12) United States Patent
Kanemoto

(10) Patent No.: US 12,467,789 B2
(45) Date of Patent: Nov. 11, 2025

(54) INFORMATION PROCESSING DEVICE, INFORMATION PROCESSING SYSTEM, AND INFORMATION PROCESSING METHOD

(71) Applicant: SEIKO EPSON CORPORATION, Tokyo (JP)

(72) Inventor: Kei Kanemoto, Fujimi (JP)

(73) Assignee: SEIKO EPSON CORPORATION (JP)

( * ) Notice: Subject to any disclaimer, the term of this patent is extended or adjusted under 35 U.S.C. 154(b) by 456 days.

(21) Appl. No.: 17/892,447

(22) Filed: Aug. 22, 2022

(65) Prior Publication Data

US 2023/0053797 A1    Feb. 23, 2023

(30) Foreign Application Priority Data

Aug. 23, 2021    (JP) .................. 2021-135372

(51) Int. Cl.
*G01J 3/28*    (2006.01)
*G06V 10/143*    (2022.01)

(52) U.S. Cl.
CPC .......... *G01J 3/2823* (2013.01); *G06V 10/143* (2022.01)

(58) Field of Classification Search
CPC ............ G01J 3/2823; G01J 3/26; G01J 3/462; G06V 10/143; G06V 20/52; G01N 21/8851

See application file for complete search history.

(56) References Cited

PUBLICATIONS

Foreign Substance Detection, Tsuta et al, 2006 (Year: 2006).*
Making light work, Elwell et al, 2011; https://www.jstor.org/stable/pdf/23057191.pdf (Year: 2011).*
M. Tsuta et al., "Foreign Substance Detection in Blueberry Fruits by Spectral Imaging", Food Science and Technology Research, May 25, 2007, pp. 96-100.

* cited by examiner

*Primary Examiner* — Jianxun Yang
(74) *Attorney, Agent, or Firm* — Harness, Dickey & Pierce, P.L.C.

(57) ABSTRACT

An information processing device includes an image acquisition unit configured to acquire spectroscopic images for a plurality of spectral wavelengths as a captured image of an imaging target, a spectrum calculation unit configured to calculate an optical spectrum in each of pixels, based on the plurality of spectroscopic images, a feature wavelength detection unit configured to detect a feature wavelength of the optical spectrum in each of the pixels, a color set unit configured to calculate a feature angle corresponding to the feature wavelength in each of the pixels and set, as a feature color of a corresponding pixel, a color in the hue circle corresponding to the feature angle, and an image generation unit configured to generate a feature detection image obtained by converting each of the pixels of the captured image into the feature color corresponding to the pixel.

9 Claims, 12 Drawing Sheets

INFORMATION PROCESSING DEVICE, INFORMATION PROCESSING SYSTEM, AND INFORMATION PROCESSING METHOD

The present application is based on, and claims priority from JP Application Serial Number 2021-135372, filed Aug. 23, 2021, the disclosure of which is hereby incorporated by reference herein in its entirety.

BACKGROUND

1. Technical Field

The present disclosure relates to an information processing device that processes an image, an information processing system, and an information processing method.

2. Related Art

Hitherto, there has been known a method of detecting a foreign material or the like other than a target object from an captured image obtained by capturing the target object as an image (For example, see Mizuki TSUTA, Tomohiro TAKAO, Junichi SUGIYAMA, Yukihiro WADA, Yasuyuki SAGARA, "Foreign Substance Detection in Blueberry Fruits by Spectral Imaging" Food Science and Technology Research, vol. 12, no. 2, The Japanese Society for Food science and technology, issued in 2006, released on May 25, 2007, pp. 96-100). In the document of Mizuki TSUTA, Tomohiro TAKAO, Junichi SUGIYAMA, Yukihiro WADA, Yasuyuki SAGARA, "Foreign Substance Detection in Blueberry Fruits by Spectral Imaging" Food Science and Technology Research, vol. 12, no. 2, The Japanese Society for Food science and technology, issued in 2006, released on May 25, 2007, pp. 96-100, there is described a method of detecting a leaf and a twig mixed in blueberries. With this, a leaf and a twig are detected from a captured image of blueberries by detecting an absorption peak wavelength of 680 nm. In other words, a foreign material present in the captured image can be detected based on an absorption peak wavelength of the foreign material to be detected.

The related-art method of detecting a foreign material as described above is effective when an absorption peak wavelength of a foreign material to be detected is known. However, when matters such as a foreign material is unknown, and optical characteristics thereof such as an absorption peak wavelength is unknown, there is a difficulty in performing feature detection of a matter, which causes a problem.

SUMMARY

An information processing device according to a first aspect of the present disclosure includes an image acquisition unit configured to acquire a plurality of spectroscopic images for a plurality of spectral wavelengths as a captured image of an imaging target, a spectrum calculation unit configured to calculate an optical spectrum in each of pixels, based on the plurality of spectroscopic images, a feature wavelength detection unit configured to detect a feature wavelength corresponding to a predetermined feature condition of the optical spectrum in each of the pixels, a color set unit configured to calculate a feature angle corresponding to the feature wavelength in each of the pixels when a spectral wavelength range including the plurality of spectral wavelengths is allocated to a predetermined angle range of a hue circle, and set, as a feature color of a corresponding pixel, a color in the hue circle corresponding to the feature angle, and an image generation unit configured to generate a feature detection image obtained by converting each of the pixels of the captured image into the feature color corresponding to the pixel.

In the information processing device according to the present aspect, the angle range of the hue circle may be 270 degrees or smaller.

In the information processing device according to the present aspect, the color set unit may set the feature color, with a shortest wavelength in the spectral wavelength range as a minimum angle in the angle range, and with a longest wavelength in the spectral wavelength range as a maximum angle in the angle range.

In the information processing device according to the present aspect, the color set unit may set the feature color, with a shortest feature wavelength, of feature wavelengths detected in a plurality of the pixels, as a minimum angle in the angle range, and with a longest feature wavelength as a maximum angle in the angle range.

In the information processing device according to the present aspect, the feature wavelength detection unit may detect n feature wavelengths corresponding to n feature conditions in each of the pixels, and the color set unit may calculate the feature angle, based on each of projection points obtained by projecting feature points on a straight line, the straight line being obtained based on the feature points corresponding to the feature wavelength in each of the pixels and being plotted in an n-dimensional space having each of the n feature conditions as an axis.

In the information processing device according to the above-mentioned aspect, the straight line may be a straight line with dispersion of the projection points corresponding to a plurality of the feature points being maximized.

In the information processing device according to the above-mentioned aspect, the color set unit may set the feature color, with one of two points most separated away from each other on the straight line as a minimum angle in the angle range and the other one as a maximum angle in the angle range.

In the information processing device according to the present aspect, the feature wavelength detection unit may detect the feature wavelength, based on secondary differential waveforms of the optical spectrum in each of the pixels.

An information processing system according to a second aspect of the present disclosure includes the information processing device according to the first aspect described above, and a spectroscopic camera configured to image the captured image including the plurality of spectroscopic images of the imaging target.

An information processing method according to a third aspect of the present disclosure is an information processing method for causing one or a plurality of processors to process image information, the information processing method causing the one or plurality of processors to execute acquiring a plurality of spectroscopic images for a plurality of spectral wavelengths as a captured image of an imaging target, calculating an optical spectrum in each of pixels, based on the plurality of spectroscopic images, detecting a feature wavelength corresponding to a predetermined feature condition of the optical spectrum in each of the pixels, calculating a feature angle corresponding to the feature wavelength in each of the pixels when a spectral wavelength range including the plurality of spectral wavelengths is allocated to a predetermined angle range of a hue circle, and setting, as a feature color of a corresponding pixel, a color in the hue circle corresponding to the feature angle, and generating a feature detection image obtained by converting each of the pixels of the captured image into the feature color corresponding to the pixel.

DESCRIPTION OF EXEMPLARY EMBODIMENTS

First Exemplary Embodiment

An information processing system according to a first exemplary embodiment of the present disclosure is described below.

Schematic Configuration of Information Processing System

Figure 1:
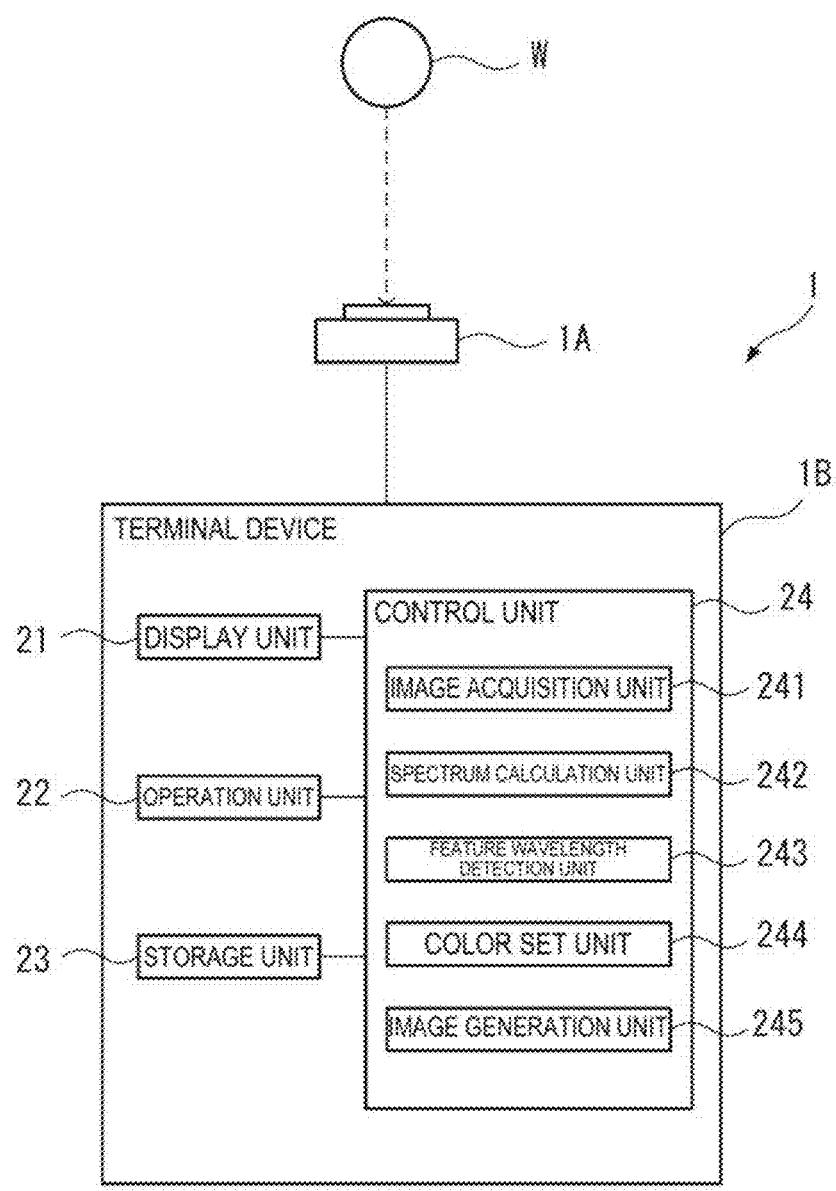
FIG. 1 is a diagram illustrating a schematic configuration of an information processing system according to a first exemplary embodiment.

FIG. 1 is a diagram illustrating a schematic configuration of the information processing system according to the present exemplary embodiment.

As illustrated in FIG. 1, the image processing system according to the present exemplary embodiment is configured to include a spectroscopic camera 1A and a terminal device 1B being an information processing device. Note that the spectroscopic camera 1A and the terminal device 1B may be configured in an integrated manner. For example, a smartphone including the spectroscopic camera 1A may be given as an example.

Schematic Configuration of Spectroscopic Camera

Figure 2:
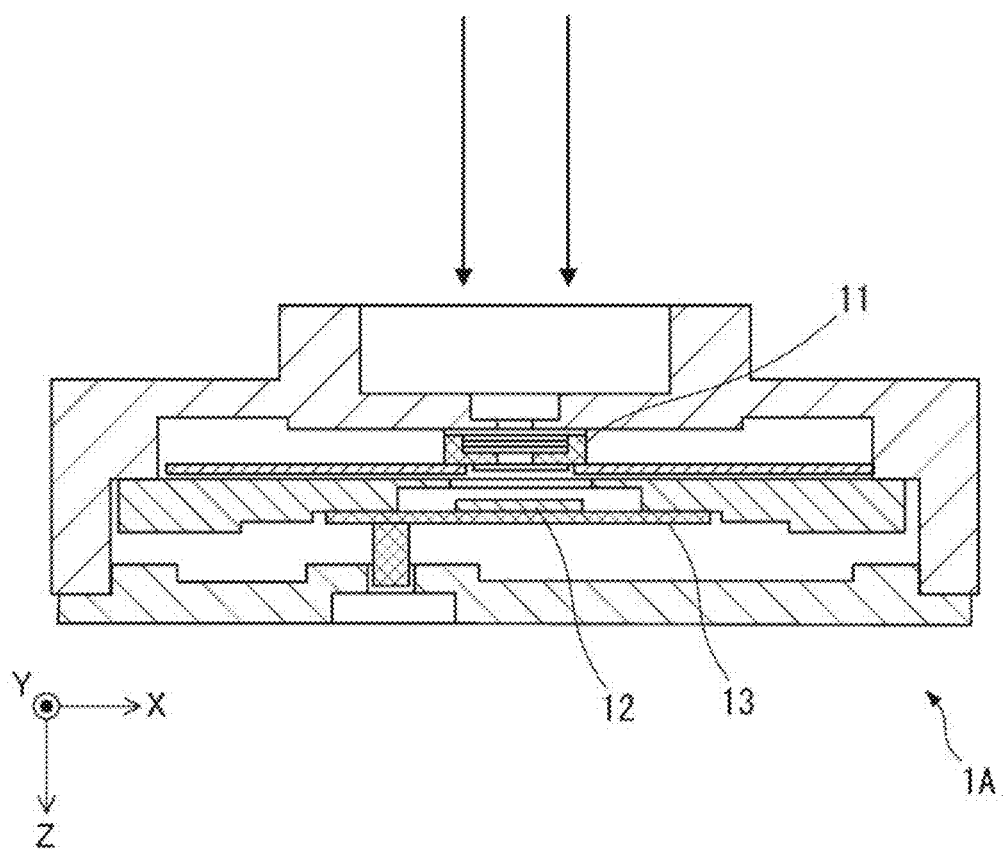
FIG. 2 is a diagram illustrating a schematic configuration of a spectroscopic camera according to the present exemplary embodiment.

FIG. 2 is a diagram illustrating a schematic configuration of the spectroscopic camera 1A according to the present exemplary embodiment. As illustrated in FIG. 2, the spectroscopic camera 1A includes a spectroscopic element 11, an imaging element 12 that images an image light spectrally separated by the spectroscopic element 11, and a camera control unit 13 that controls an operation of the spectroscopic camera 1A.

For example, the spectroscopic element 11 may use an interference filter (Fabry-Perot etalon) in which a pair of reflection films are arranged so as to face each other. In the interference filter, the dimension of the gap between the pair of reflection films is changed. With this, the wavelength of the light to be spectrally separated can be changed. The imaging element 12 is formed of, for example, a Charge-Coupled Device (CCD), a Complementary Metal-Oxide Semiconductor (CMOS), or the like, and images light that is spectrally separated by the spectroscopic element 11.

The camera control unit 13 controls the spectroscopic element 11 and the imaging element 12, based on an imaging command from the terminal device 1B, and a captured image of an imaging target W is obtained. In the present exemplary embodiment, the camera control unit 13 sequentially switches a spectral wavelength of the light passing through the spectroscopic element 11, and the imaging element 12 captures a spectroscopic image every time the spectral wavelength is switched.

The camera control unit 13 transmits, to the terminal device 1B, a plurality of spectroscopic images obtained as the captured images of the imaging target W.

Configuration of Terminal Device

Referring back to FIG. 1, for example, the terminal device 1B may be configured as a general computer such as a smartphone, a tablet terminal, and a personal computer, and corresponds to the information processing device according to the present disclosure. Specifically, the terminal device 1B includes a display unit 21, an operation unit 22, a storage unit 23, and a control unit 24. In addition to those units, the terminal device 1B may include a communication device or the like capable of communicating with an external device via the Internet or the like.

The display unit 21 is a display, and displays an image under control of the control unit 24. The operation unit 22 is configured as a keyboard, a mouse, a touch panel, or the like, receives an input operation from a user, and inputs, to the control unit 24, an operation signal corresponding to the input operation.

The display unit 21 and the operation unit 22 may be configured integrally with the terminal device 1B, or may be communicably connected to the terminal device 1B as bodies independent from the terminal device 1B.

The storage unit 23 is an information storage device such as a semiconductor memory and a hard disk, and stores various programs or various types of data for controlling the terminal device 1B and the information processing system 1. For example, the storage unit 23 stores an information processing program for detecting features of the imaging target W from a plurality of spectroscopic images of the imaging target W that are obtained as captured images. Hue circle information indicating a hue circle used for the information processing program and the like are stored.

The control unit 24 is configured as an arithmetic circuit such as a Central Processing Unit (CPU), and may be achieved with one or a plurality of processors. The control unit 24 reads and executes the various programs stored in the storage unit 23. For example, in the present exemplary embodiment, by reading and executing the information processing program stored in the storage unit 23, the control unit 24 functions as an image acquisition unit 241, a spectrum calculation unit 242, a feature wavelength detection unit 243, a color set unit 244, and an image generation unit 245.

The image acquisition unit 241 acquires spectroscopic images for a plurality of spectral wavelengths, which are input from the spectroscopic camera 1A, as captured images. In other words, the plurality of spectroscopic images included in the captured images are obtained by capturing the same imaging target as images under the same imaging conditions, and each pixel of each of the spectroscopic images has information relating to the same position in the imaging target.

Note that, in the present exemplary embodiment, the image acquisition unit 241 acquires, as a captured image, each of the spectroscopic images obtained by capturing the imaging target W at the plurality of spectral wavelengths by the spectroscopic camera 1A, however, the acquisition is not limited thereto. For example, the image acquisition unit 241 may acquire, as captured images, a plurality of spectroscopic images transmitted via the Internet or the like, or may acquire, as captured images, the plurality of spectroscopic images stored in the storage unit 23.

The spectrum calculation unit 242 calculates an optical spectrum in each pixel in the captured image. In other words, based on a signal value of a pixel (i, j) in each of the spectroscopic images, an optical spectrum in the pixel (i, j) is calculated.

The feature wavelength detection unit 243 detects a feature wavelength corresponding to a predetermined feature condition in each pixel, based on the optical spectrum. The predetermined feature condition is a condition indicating a feature of the optical spectrum, and examples of the predetermined feature condition include a peak wavelength with the highest peak of the optical spectrum, a peak wavelength with the second highest peak thereof, a bottom wavelength with the maximum bottom depth (that is, a peak wavelength of the optical spectrum that projects downward). In addition, the examples include a zero-cross point, a peak wavelength, and a bottom wavelength of a primary differential waveform of the optical spectrum, and a zero-cross point, a peak wavelength, and a bottom wavelength of a secondary differential waveform of the optical spectrum. In the present exemplary embodiment, of the peak wavelengths included in the secondary differential waveform of the optical spectrum, a peak wavelength with the highest peak is used as the feature condition.

The color set unit 244 sets a color indicating a feature of each pixel, based on the calculated optical spectrum. Specifically, the color set unit 244 calculates an angle in a hue circle, which corresponds to the feature wavelength of each pixel when a spectral wavelength range including the spectral wavelengths of the plurality of spectroscopic images acquired is allocated to a predetermined angle range of the hue circle, and sets, as the color corresponding to the pixel, a color in the hue circle corresponding to the angle. Therefore, in the present exemplary embodiment, the color of each pixel is set to a color irrelevant to the actual color of the imaging target W.

The image generation unit 245 generates a feature detection image by converting each pixel in the captured image into the corresponding pixel color set by the color set unit 244, and the feature detection image is displayed on the display unit 21.

Information Processing Method

Next, an information processing method performed by the information processing system 1 according to the present exemplary embodiment is described in detail.

Figure 3:
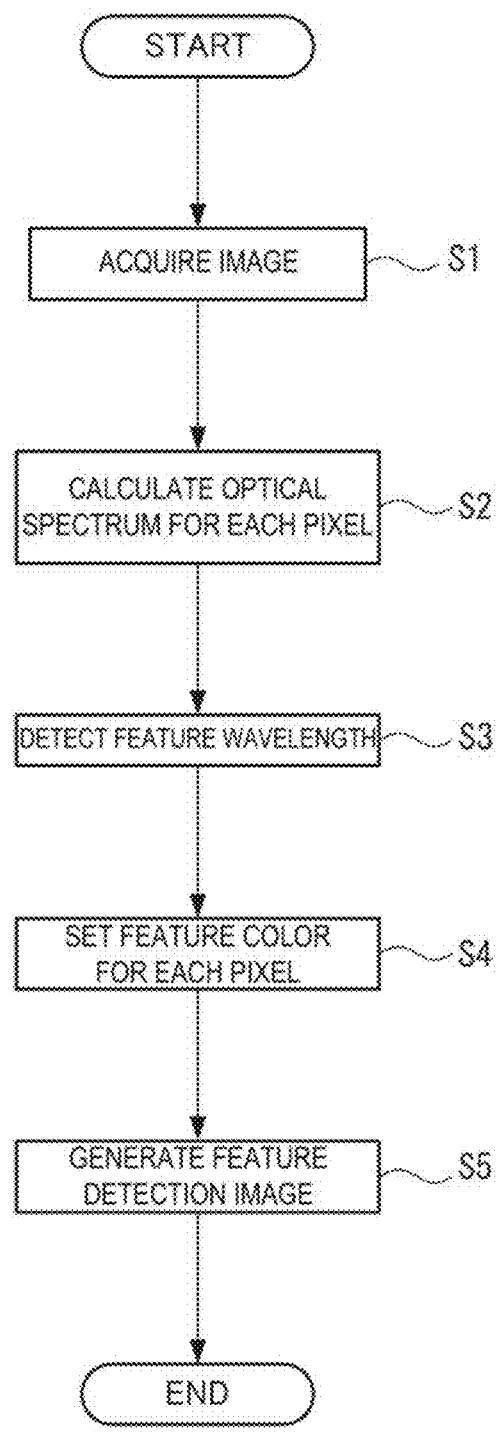
FIG. 3 is a flowchart illustrating an information processing method according to the present exemplary embodiment.

FIG. 3 is a flowchart illustrating the information processing method according to the present exemplary embodiment.

In the present exemplary embodiment, for example, when a user performs an input operation for executing detection processing of detecting a feature of the imaging target W in the terminal device 1B, the image acquisition unit 241 acquires a captured image of an imaging target (Step S1: image acquisition step).

For example, the image acquisition unit 241 outputs, to the spectroscopic camera 1A, an imaging command for capturing spectroscopic images for a plurality of spectral wavelengths. With this, the spectroscopic camera 1A captures respective spectroscopic images of the imaging target with respect to the plurality of spectral wavelengths, and returns those spectroscopic images to the terminal device 1B, as the captured images of the imaging target. With this, the image acquisition unit 241 acquires the captured images including the plurality of spectroscopic images.

Note that examples of the detection processing of detecting a feature of the imaging target W include processing of detecting a position of an inspected object and a position of a foreign material other than the inspected object while regarding an inspection sample containing the inspected object as the imaging target W, and processing of detecting a position of each inspected object in an inspection sample containing a plurality of inspected objects.

Subsequently, the spectrum calculation unit 242 calculates the optical spectrum in each pixel in the captured image, based on the plurality of spectroscopic images included in the imaging target W, which are acquired in Step S1 (Step S2: spectrum calculation step). In other words, the spectrum calculation unit 242 calculates a relationship between the wavelength and the signal value of the pixel (i, j), based on the signal value of the pixel (i, j) in each spectroscopic image. Note that, in the present exemplary embodiment, the optical spectrum is calculated based on the signal value of each wavelength in each pixel (a luminance value of the captured image), but alternatively, for example, an optical spectrum in each pixel and an emission spectrum of the light source may be used to calculate a reflectance spectrum in each pixel, an absorption spectrum, or the like.

Figure 4:
FIG. 4 is a diagram illustrating one example of a captured image obtained by capturing an imaging target as an image, in which flour as an inspected object and polyethylene as a foreign material are mixed in the present exemplary embodiment.
Figure 5:
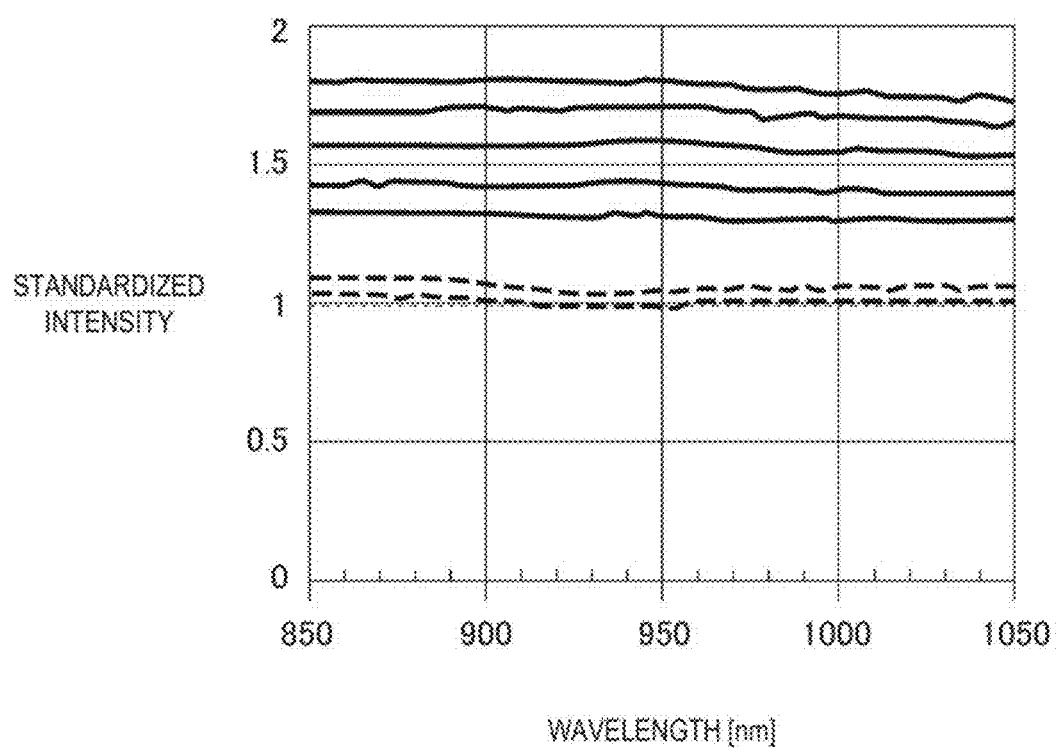
FIG. 5 is a diagram illustrating one example of optical spectra in a plurality of pixels of the captured image in FIG. 4.

FIG. 4 illustrates an image example obtained by capturing the imaging target W as an image, in which flour as an inspected object and polyethylene as a foreign material are mixed. FIG. 5 is a diagram illustrating one example of optical spectra in a plurality of pixels of the captured image. In FIG. 5, the solid line indicates an optical spectrum of flour, and the broken line indicates an optical spectrum of polyethylene.

After Step S2, the feature wavelength detection unit 243 detects the feature wavelength from the optical spectrum calculated in Step S2 (Step S3: feature wavelength detection step).

Figure 6:
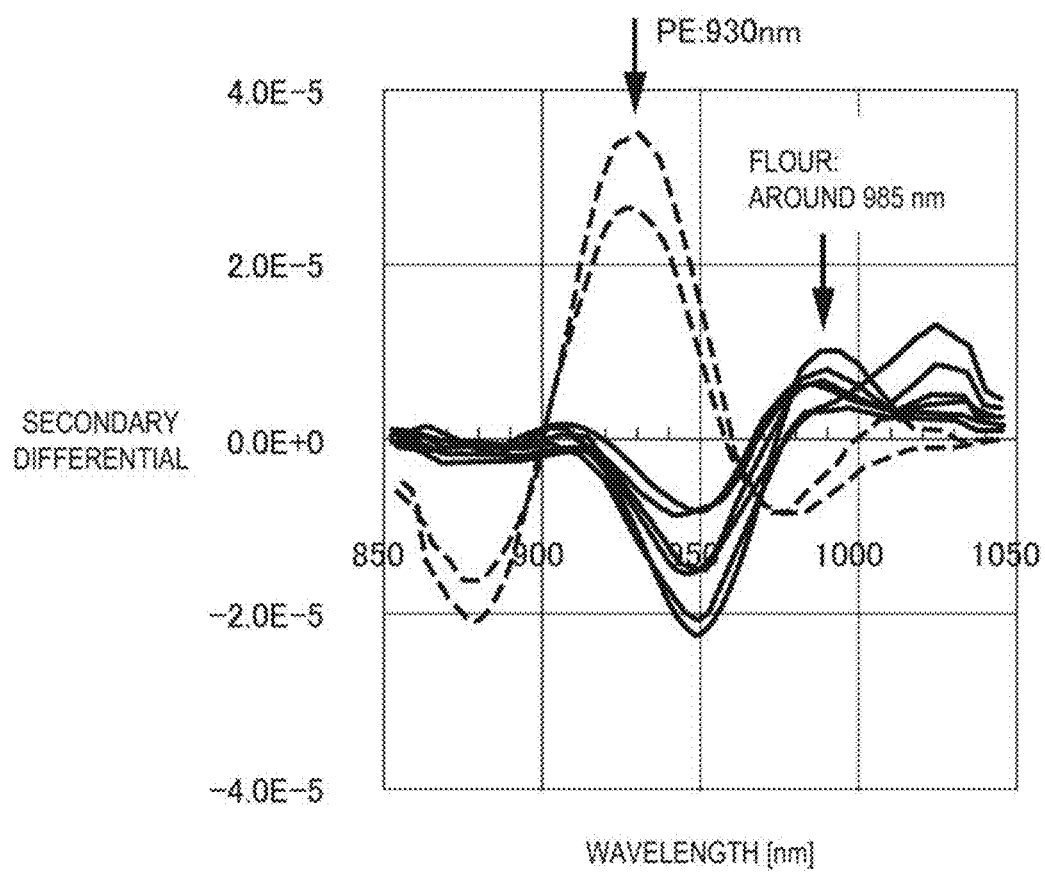
FIG. 6 is a diagram illustrating secondary differential waveforms of the optical spectra in FIG. 5.

FIG. 6 illustrates secondary differential waveforms of the optical spectra in FIG. 5. In FIG. 6, the solid line indicates an optical spectrum of flour, and the broken line indicates an optical spectrum of polyethylene.

In the present exemplary embodiment, the feature wavelength detection unit 243 detects, as the feature wavelength, the peak wavelength of the secondary differential waveform of the optical spectrum, which is acquired in Step S2. Here, noise components in the secondary differential waveform are emphasized in some cases. Thus, it is preferred that smoothing processing be executed to reduce the noise components. Even when the optical spectrum has such a spectral shape that detection of a peak wavelength is difficult, as illustrated in FIG. 5, the feature wavelength such as the peak wavelength or the bottom wavelength in the optical spectrum can be detected at high accuracy by using the secondary differential waveform described above.

Subsequently, the color set unit 244 reads the hue circle information from the storage unit 23, specifies an angle in the hue circle, which corresponds to the peak wavelength in each pixel, and sets a color corresponding to the angle as a feature color corresponding to the pixel (Step S4: color set step).

Figure 7:
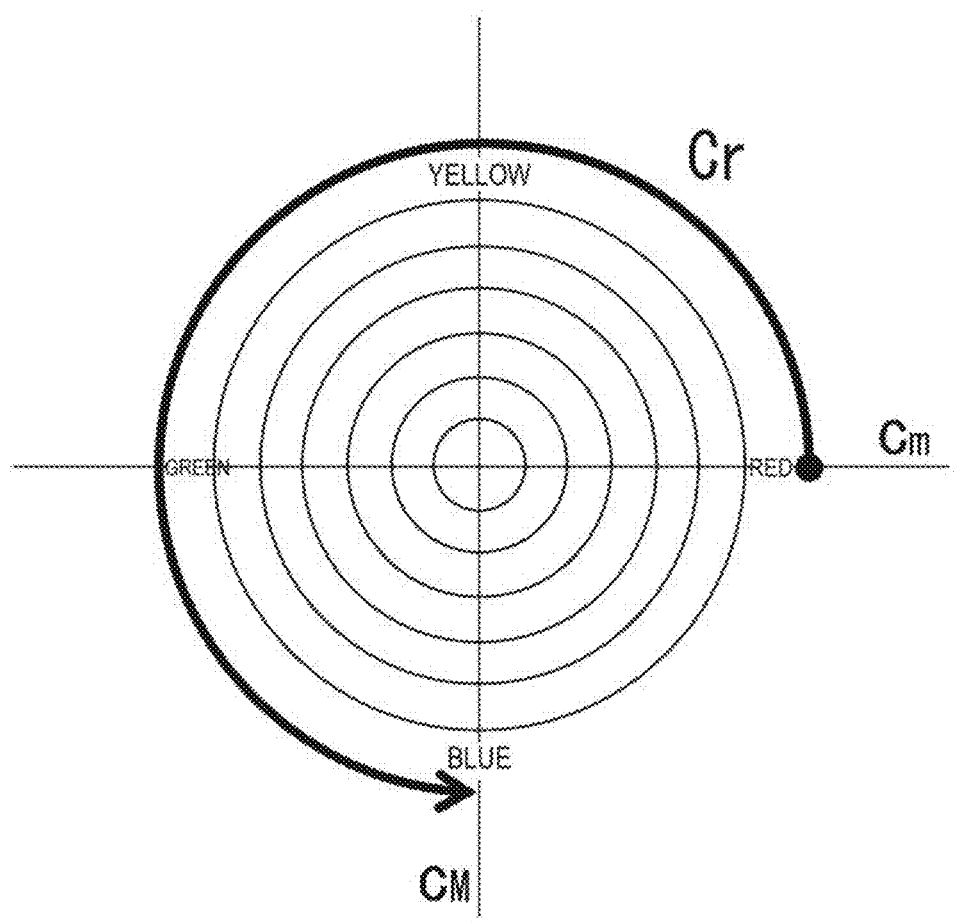
FIG. 7 is a diagram illustrating an angle range for setting a color from a hue circle.

FIG. 7 is a diagram illustrating an angle range Cr for setting a color from the hue circle. The angle range Cr is a range of 270 degrees or smaller in the hue circle, and is set in advance. The minimum angle $c_m$ is also set in advance. For example, in the present exemplary embodiment, as illustrated in FIG. 7, the range from 0 degree to 270 degrees is set as the angle range Cr in the hue circle. The minimum angle $c_m$ is set to 0 degree, and the maximum angle $c_M$ is set to 270 degrees. Note that the angle range Cr and the minimum angle $c_m$ may be set in a freely selected manner by a user.

Figure 8:
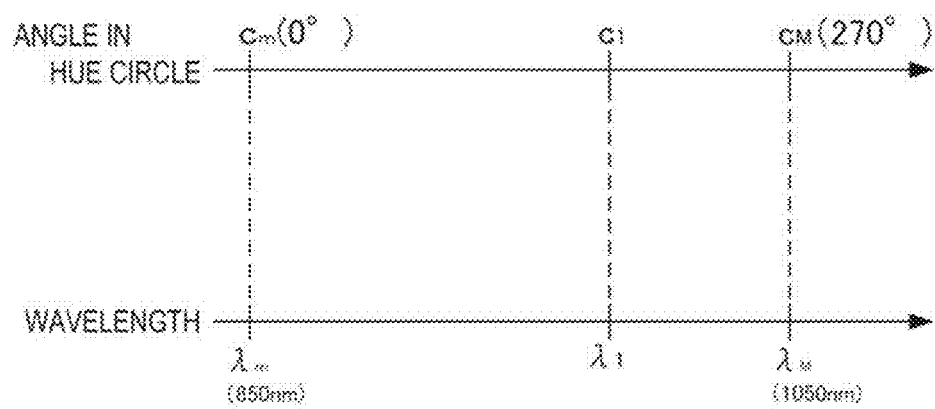
FIG. 8 is a diagram describing a method of determining a feature color of each pixel in the present exemplary embodiment.

FIG. 8 is a diagram describing a method of determining a feature color of each pixel in the present exemplary embodiment.

The color set unit 244 specifies an angle in the hue circle, which corresponds to the feature wavelength (in the present exemplary embodiment, a peak wavelength) of each pixel in the captured image. In other words, as illustrated in FIG. 8, the color set unit 244 allocates a shortest wavelength $\lambda_m$ of the spectroscopic image, which is acquired in Step S1, to the minimum angle $c_m$, and allocates a longest wavelength $\lambda_M$ of the spectroscopic image to the maximum angle $c_M$. With this, an angle (feature angle $c_1$) for a feature wavelength $\lambda_1$ is calculated from $c_1=c_m+(c_M-c_m)\times(\lambda_1-\lambda_m)/(\lambda_M-\lambda_m)$. For example, when the spectroscopic images from 850 nm to 1050 nm are acquired at a predetermined wavelength interval, the spectral wavelength range of the captured images is from 850 nm to 1050 nm. The angle range in the hue circle is set from 0 degree to 270 degrees. In this case, 850 nm being the shortest wavelength $\lambda_m$ in the spectral wavelength range is allocated to 0 degree being the minimum angle $c_m$, and 1050 nm being the longest wavelength $\lambda_M$ in the spectral wavelength range is allocated to 270 degrees being the maximum angle $c_M$. Thus, in this case, the feature angle $c_1$ with respect to the feature wavelength $\lambda_1$ is obtained from $c_1=1.35\lambda_1-1147.5$.

The color set unit 244 sets a feature color corresponding to the feature angle $c_1$ thus obtained, based on the hue circle. Here, the angle range Cr is 270 degrees or smaller, and hence the shortest wavelength $\lambda_m$ and the longest wavelength $\lambda_M$ in the spectral wavelength range have different hues. With this, the two wavelengths can be distinguished from each other as appropriate.

After the steps described above, the image generation unit 245 generates the feature detection image obtained by replacing each pixel in the captured image with the corresponding pixel color set in Step S4 (Step S5).

With the information processing method as described above, matters contained in the imaging target W and foreign materials mixed in the matters can be detected even when absorption wavelengths and the like of those are unknown.

Figure 9:
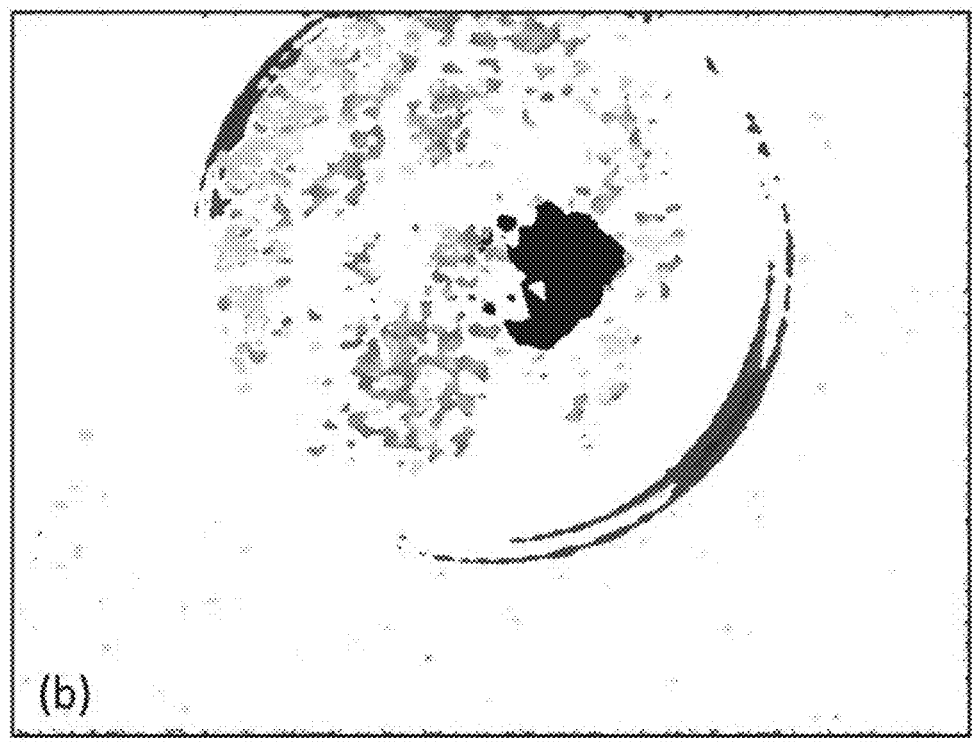
FIG. 9 is a diagram illustrating one example of a feature detection image with respect to the captured image in FIG. 4.

For example, FIG. 9 is a diagram illustrating one example of the feature detection image with respect to the captured image in FIG. 4. Note that, in FIG. 9, a grayscale image is displayed. In actuality, a black part in FIG. 9 is displayed in yellow with a suggestion of green, and a gray part in FIG. 9 is displayed in blue green. In the present exemplary embodiment, the feature wavelength of flour being the inspected object is 985 nm and the feature wavelength of polyethylene being the foreign material is 930 nm. In this case, in the feature detection image, blue green corresponding to the hue angle at 182 degrees is displayed at the pixel position of flour (inspected object), and yellow with a suggestion of green, which corresponds to the hue angle at 108 degrees, is displayed at the pixel position of polyethylene (foreign material).

Effects of Present Exemplary Embodiment

The information processing system 1 according to the present exemplary embodiment includes the spectroscopic camera 1A that captures the captured images including the plurality of spectroscopic images of the imaging target W and the terminal device 1B being an information processing device.

The terminal device 1B includes the storage unit 23 and the control unit 24. By reading and executing the information processing program stored in the storage unit 23, the control unit 24 functions as the image acquisition unit 241, the spectrum calculation unit 242, the feature wavelength detection unit 243, the color set unit 244, and the image generation unit 245. The image acquisition unit 241 acquires spectroscopic images for a plurality of spectral wavelengths as the captured images of the imaging target W. The spectrum calculation unit 242 calculates the optical spectrum in each pixel, based on the plurality of spectroscopic images. The feature wavelength detection unit 243 detects the feature wavelength corresponding to the predetermined feature condition of the optical spectrum in each pixel. The color set unit 244 calculates the feature angle $c_1$ corresponding to the feature wavelength in each pixel when the spectral wavelength range is allocated to the predetermined angle range Cr in the hue circle, and sets the color in the hue circle, which corresponds to the feature angle $c_1$, as the feature color. The image generation unit 245 generates the feature detection image by converting each pixel in the captured image into the feature color corresponding to the pixel.

With this, in the present exemplary embodiment, even when matters such as inspected objects and foreign materials contained in the imaging target W are unknown, and optical characteristics such as absorption wavelengths of those matters are also unknown, features of the matters can be indicated with colors. Thus, feature detection can be easily performed. For example, in the present exemplary embodiment, even when optical characteristics of the inspected object and the foreign material are unknown, the inspected object and the foreign material can be distinguished from each other as appropriate, and the two can be clearly indicated with contrast between the colors.

In the present exemplary embodiment, the angle range Cr in the hue circle is set to 270 degrees or smaller.

With this, when the color set unit 244 sets the feature colors for the feature wavelengths, different colors can be set for different wavelengths. In other words, when the angle range Cr is 360 degree, the feature color of the shortest wavelength and the feature color of the longest wavelength in the spectral wavelength range are substantially the same color, which makes difficult to distinguish the two colors from each other. In view of this, as described above, the angle range Cr is narrowed, and the feature color of the shortest wavelength and the feature color of the longest wavelength can be set to different colors.

In the present exemplary embodiment, the color set unit 244 sets the feature color, with the shortest wavelength $\lambda_m$ in the spectral wavelength range as the minimum angle $c_m$ in the angle range Cr in the hue circle, and with the longest wavelength $\lambda_M$ in the spectral wavelength range as the maximum angle $c_M$ in the angle range Cr in the hue circle.

With this, the feature wavelengths included in the spectral wavelength range can be completely covered, and pixels of the respective feature wavelengths can be indicated with different colors in the feature detection image.

In the present exemplary embodiment, a peak wavelength (bottom wavelength) of the optical spectrum, which protrudes downward, is used as a feature wavelength. In other words, the feature wavelength used in the present exemplary embodiment is an absorption peak wavelength of the optical spectrum, and the absorption peak wavelength is a distinctive wavelength indicating a feature of a matter contained in the imaging target W. Therefore, when the absorption peak wavelength as described above is detected, a matter in the imaging target W can be suitably differentiated, and hence can be suitably distinguished from other matters such as a foreign material.

In the present exemplary embodiment, the feature wavelength detection unit 243 specifies the feature wavelength, based on the secondary differential waveform of the optical spectrum in each pixel. With this, even when the spectral shape of the optical spectrum is such a relatively gentle shape that detection of a peak wavelength or a bottom wavelength is difficult, a convex and a concave in the spectral shape can be emphasized. Thus, the feature wavelength such as a peak wavelength and a bottom wavelength of the optical spectrum can be detected at high accuracy.

Second Exemplary Embodiment

In the first exemplary embodiment given above, the color set unit 244 calculates the feature angle $c_1$ of each feature wavelength, with the shortest wavelength $\lambda_m$ in the spectral wavelength range as the minimum angle $c_m$ in the hue circle, and with the longest wavelength $\lambda_M$ in the spectral wavelength range as the maximum angle $c_M$ in the hue circle.

In this case however, when the inspected object and the foreign material contained in the imaging target W have close feature wavelengths, a difference between the two colors may be less recognizable in the feature detection image in some cases. In view of this, in the second exemplary embodiment, a method of setting the feature color, which is performed by the color set unit 244, is different from that of the first exemplary embodiment.

Note that, in the following description, the matters that are already described are denoted with the same reference symbols, and description therefor is omitted or simplified.

The information processing system according to the second exemplary embodiment has a configuration similar to that in the first exemplary embodiment, and includes the spectroscopic camera 1A and the terminal device 1B. The terminal device 1B includes the storage unit 23 and the control unit 24. By reading and executing the information processing program stored in the storage unit, the control unit 24 functions as the image acquisition unit 241, the spectrum calculation unit 242, the feature wavelength detection unit 243, the color set unit 244, and the image generation unit 245.

Those configurations in the present exemplary embodiment are similar to those in the first exemplary embodiment, and the processing executed by the color set unit 244 is different from that in the first exemplary embodiment. Therefore, here, description is made on the processing executed by the color set unit 244, and description for the other configurations is omitted.

Figure 10:
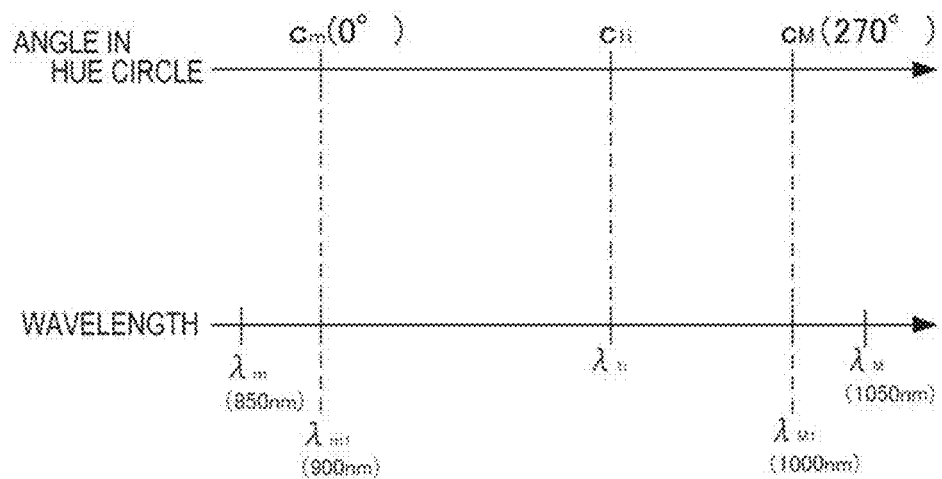
FIG. 10 is a diagram describing a method of determining a feature color of each pixel in a second exemplary embodiment.

FIG. 10 is a diagram describing a method of determining a color of each pixel in the second exemplary embodiment.

Similarly to the first exemplary embodiment, as illustrated in FIG. 3, the processing from Step S1 to Step S3 is executed, and the feature wavelength in each pixel is detected in the information processing system according to the present exemplary embodiment.

In the present exemplary embodiment, in Step S4 being a subsequent step, when the plurality of feature wavelengths are detected in Step S3, the color set unit 244 allocates a shortest feature wavelength $\lambda_{m1}$ of the detected feature wavelengths to the minimum angle $c_m$, and allocates a longest feature wavelength $\lambda_{M1}$ of the detected feature wavelengths to the maximum angle $c_M$. Then, a feature angle $c_i$ of another feature wavelength $\lambda_{1i}$ is calculated from $c_{1i}=c_m+(c_M-c_m)\times(\lambda_{1i}-\lambda_{m1})/(\lambda_{M1}-\lambda_{m1})$. For example, when, in the spectral wavelength range from 850 nm to 1050 nm, the angle range Cr in the hue circle is set from 0 degree to 270 degrees, the shortest wavelength $\lambda_{m1}$ of the feature wavelength is 900 nm, and the longest wavelength $\lambda_{M1}$ of the feature wavelength is 1000 nm, the feature angle $c_{1i}$ of the feature wavelength $\lambda_{1i}$ is obtained from $c_{1i}=2.7\lambda_{1i}-2430$.

Particularly, when two or more kinds of inspected objects are contained in the imaging target W, the shortest wavelength of the feature wavelengths of those inspected objects is $\lambda_{m1}$, and the longest wavelength thereof is $\lambda_{M1}$. With this, a foreign material can be suitably detected.

In other words, when the inspection sample contains a foreign material, and the feature wavelength $\lambda_d$ of the foreign material falls within $\lambda_{m1}<\lambda_d<\lambda_{M1}$, a feature color corresponding to the feature wavelength $\lambda_d$ of the foreign material is displayed in the feature detection image. Even when the feature wavelength $\lambda_d$ is close to $\lambda_{m1}$ or $\lambda_{M1}$, an angle difference between the hue of the feature color of the foreign material and the hue of the feature color of the inspected object is increased as compared to the first exemplary embodiment, and hence a position at which the foreign material is present can easily be distinguished in the feature detection image.

Figure 11:
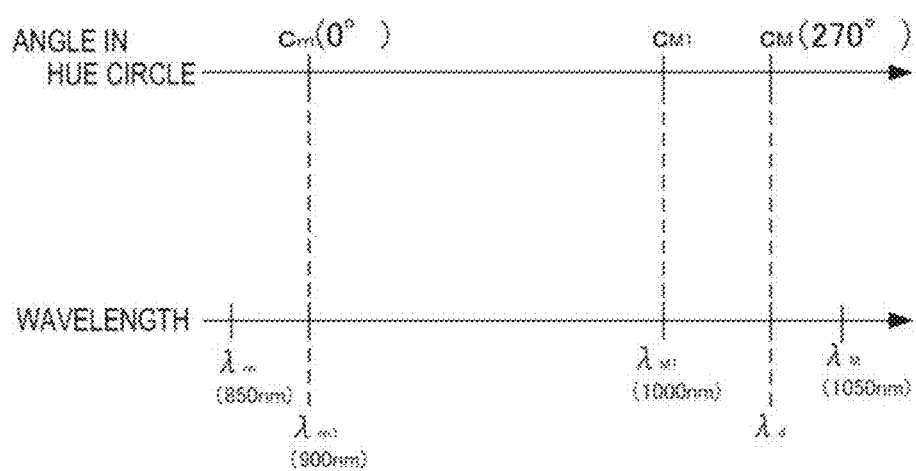
FIG. 11 is an explanatory diagram when, in FIG. 10, a feature wavelength $\lambda_d$ of a foreign material is expressed with $\lambda_d > \lambda_{M1}$.

FIG. 11 is an explanatory diagram when the feature wavelength $\lambda_d$ of the foreign material falls within $\lambda_d>\lambda_{M1}$.

When the feature wavelength $\lambda_d$ of the foreign material falls within $\lambda_d>\lambda_{M1}$, $\lambda_d$ is allocated to the maximum angle $c_m$ in the angle range Cr. In this case, there is generated a feature detection image in which the hue of the inspected object having the feature wavelength $\lambda_{M1}$ is significantly different from that in the inspection sample without the foreign material.

Although illustration is omitted, this holds true when the feature wavelength $\lambda_d$ of the foreign material falls within $\lambda_d<\lambda_{m1}$. In this case, $\lambda_d$ is allocated to the minimum angle $c_m$ in the angle range Cr. Thus, there is generated a feature detection image in which the hue of the inspected object having the feature wavelength $\lambda_{m1}$ is significantly different from that in the inspection sample without the foreign material.

As described above, when the foreign material is contained, there is generated a feature detection image having a whole hue that is significantly different from a feature detection image without the foreign material. Even when a content amount of the foreign material is small, presence or absence of the foreign material can be determined as appropriate. Particularly, when the inspection sample is sequentially captured as images in a continuous manner, and whether each inspection sample contains a foreign material is sequentially inspected, the inspection sample in which the foreign material is mixed can be easily found.

Note that, in a case in which the imaging target W is an inspection sample including one inspected object, when the foreign material is not mixed, the number of feature wavelengths is one. In this case, the feature color may be set by a method similar to that in the first exemplary embodiment.

When the inspection sample as described above is sequentially captured as images in a continuous manner, and whether each inspection sample contains a foreign material is sequentially inspected, the method in the first exemplary embodiment and the method in the second exemplary embodiment are switched, thereby detecting the foreign material more appropriately.

In other words, when the inspection sample does not contain the foreign material, only the feature wavelength of the inspected object is acquired. Thus, the feature color is provided to the feature wavelength by the method in the first exemplary embodiment. Meanwhile, when the inspection sample contains the foreign material, the feature wavelength of the inspected object and the feature wavelength of the foreign material are detected. Thus, the feature color is provided to each of the feature wavelengths by the method in the second exemplary embodiment.

In this case, the hue of the detected object in the feature detection image is significantly changed between a case in which the inspection sample does not contain the foreign material and a case in which the inspection sample contains the foreign material. Therefore, even when an amount of the foreign material is small in the inspection sample containing the foreign material, it is possible to appropriately notify that the foreign material is mixed.

Effects of Present Exemplary Embodiment

In the terminal device 1B according to the present exemplary embodiment, the color set unit 244 sets the feature color, with the shortest feature wavelength $\lambda_{m1}$, of the feature wavelengths detected in the plurality of pixels, as the minimum angle $c_m$ in the hue circle, and with the longest feature wavelength $\lambda_{M1}$ as the maximum angle $c_M$ in the hue circle.

With this, as illustrated in FIG. 10, even when two or more feature wavelengths are present, and a difference between those feature wavelengths is small, a difference between the feature angles of the respective feature wavelengths can be increased as compared to the first exemplary embodiment. Thus, in the feature detection image, a hue of a pixel position at which a foreign material is present is significantly different. With this, a position at which each matter is present can be distinguished more easily.

Third Exemplary Embodiment

In the first exemplary embodiment and the second exemplary embodiment given above, the feature wavelength detection unit 243 detects one feature wavelength from an optical spectrum in each pixel, and the color set unit 244 sets a feature color, based on the feature wavelength.

Meanwhile, some matters have approximating maximum peak wavelengths but different second-highest peak wavelengths, or have approximating maximum peak wavelengths but different bottom wavelengths, for example. It may be difficult to distinguish those matters from each other in some cases.

In order to solve such a problem, in the third exemplary embodiment, a plurality of feature wavelengths are detected from an optical spectrum in each pixel, and a feature color is set from those feature wavelengths.

The information processing system according to the third exemplary embodiment has a configuration similar to that in the first exemplary embodiment, and includes the spectroscopic camera 1A and the terminal device 1B. The terminal device 1B includes the storage unit 23 and the control unit 24. By reading and executing the information processing program stored in the storage unit, the control unit 24 functions as the image acquisition unit 241, the spectrum calculation unit 242, the feature wavelength detection unit 243, the color set unit 244, and the image generation unit 245.

Those configurations in the present exemplary embodiment are similar to those in the first exemplary embodiment, however, the processing executed by the feature wavelength detection unit 243 and the color set unit 244 is different from that in the first exemplary embodiment. Therefore, here, description is made on the processing executed by the feature wavelength detection unit 243 and the color set unit 244, and description for the other configurations is omitted.

Figure 12:
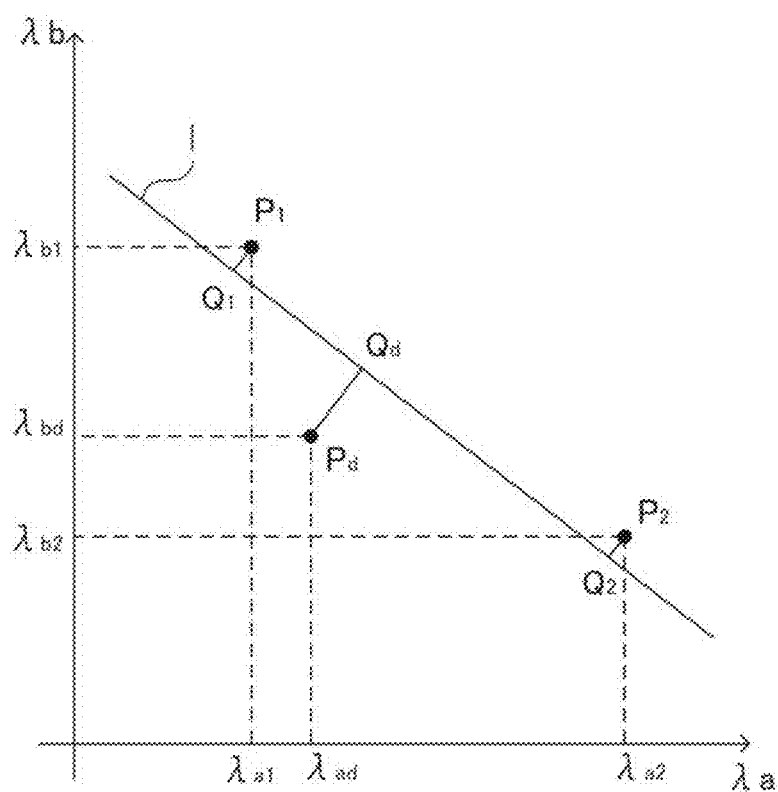
FIG. 12 is a diagram describing a method of determining a color of each pixel in a third exemplary embodiment.

FIG. 12 is a diagram describing a method of determining a color of each pixel in the third exemplary embodiment.

Similarly to the first exemplary embodiment, as illustrated in FIG. 3, the feature wavelength detection unit 243 detects feature wavelengths in Step S3 after executing Step S1 and Step S2 in the information processing system according to the present exemplary embodiment.

Here, in the present exemplary embodiment, the feature wavelength detection unit 243 selects n feature wavelengths having predetermined features in each pixel. The n feature wavelengths have features that are different from each other, and may be selected from, for example, a peak wavelength with the highest peak, a bottom wavelength with the maximum bottom depth, and a peak wavelength with the second highest peak, a zero-cross point, a peak wavelength, and a bottom wavelength of a primary differential waveform of the optical spectrum, a zero-cross point, a peak wavelength, and a bottom wavelength of a secondary differential waveform of the optical spectrum, and the like. For simplification of the description, there is given an example in which two feature wavelengths are selected from each pixel. Here, it is assumed that n=2, that a peak wavelength with the highest peak of secondary differential waveform of the optical spectrum is a first feature wavelength $\lambda a$, and that a peak wavelength with the second highest peak thereof is a second feature wavelength $\lambda b$.

In Step S4, the color set unit 244 calculates a feature angle based on a straight line l based on feature points P. The straight line l is obtained by plotting the n feature wavelengths in each pixel, which are detected in Step S3, as the feature points P in an n-dimensional space.

For example, in the present exemplary embodiment, n=2. As illustrated in FIG. 12, the feature points P are plotted in the two-dimensional space with a first axis corresponding to the first feature wavelength $\lambda a$ and a second axis corresponding to the second feature wavelength $\lambda b$. In the example of FIG. 12, a feature point $P_1$ in a pixel having a first feature wavelength $\lambda_{a1}$ and a second feature wavelength $\lambda_{b1}$, a feature point $P_2$ in a pixel having a first feature wavelength $\lambda_{a2}$ and a second feature wavelength $\lambda_{b2}$, and a feature point $P_d$ in a pixel having a first feature wavelength $\lambda_{ad}$ and a second feature wavelength $\lambda_{bd}$ are given. The inspection sample contains two kinds of inspected objects and a foreign material. The feature points P corresponding to one inspected object are plotted so as to approach each other, and the feature points P corresponding to the other inspected object are plotted so as to approach each other.

The straight line l obtained based on the feature points P is preferably a straight line on which dispersion of respective projection points Q is maximized. Here, the projection point Q is a point obtained by projecting each of the feature points P on the straight line l. The color set unit 244 calculates a main component value of each of the projection points Q by using a main component analysis method, and converts the main component value into an angle in the hue circle.

For example, the color set unit 244 generates a variance-covariance matrix by using element vectors (first feature wavelength $\lambda_{ai}$, second feature wavelength $\lambda_{bi}$) of feature points Pi (a suffix i is a variable indicating a pixel position) of all the pixels, and calculates eigenvalues and eigenvectors of the variance-covariance matrix. Note that, when the n feature wavelengths are selected from each pixel, n eigenvalues and n eigenvectors are obtained. Of those eigenvalues, the maximum eigenvalue is a first eigenvalue, and the eigenvector corresponding to the first eigenvalue is a first eigenvector. The color set unit 244 calculates a main component value of each pixel, based on an inner product of the element vector and the first eigenvector of each pixel. The main component value is a parameter indicating a position of each pixel on the straight line l on which dispersion of the projection points Q is maximized, and is a parameter obtained by converting the n-th dimensional data into first dimensional data.

After the processing, similarly to the second exemplary embodiment, the color set unit 244 converts the main component value in each pixel into the feature angle, and sets the feature color corresponding to the feature angle.

In other words, the projection point Q with the minimum main component value on the straight line l is allocated to the minimum angle $c_m$ in the hue circle, and the projection point Q with the maximum main component value is allocated to the maximum angle $c_M$ in the hue circle. With this, the feature angle is calculated from the main component value in each pixel. In other words, two projection points Q most separated away from each other are selected from the respective projection points Q on the straight line l, one with the smaller main component value (the projection point $Q_1$ in FIG. 12) is allocated to the minimum angle $c_m$, and the other one with the greater main component value (the projection point $Q_2$ in FIG. 12) is allocated to the maximum angle $c_M$.

Effects of Present Exemplary Embodiment

In the terminal device 1B according to the present exemplary embodiment, the feature wavelength detection unit 243 selects the n wavelengths having the predetermined features as the feature wavelengths in each pixel. The color set unit 244 plots the feature points P, which corresponds to the feature wavelengths in the respective pixels, in the n-dimensional space having the n features as axes, and calculates the feature angle in each pixel, based on each of the projection points Q obtained by projecting the feature points P on the straight line l based on the feature points P.

With this, the feature color can be set based on not only one feature but also a plurality of features from the optical spectrum in each pixel. For example, even when the imaging target W contains a greater number of inspected objects, the respective inspected objects can be distinguished from each other, based on the plurality of feature wavelengths. Even when the foreign material has a peak wavelength similar to that of the inspected object, the inspected object and the foreign material can be distinguished from each other, based on the other feature wavelengths.

MODIFICATION EXAMPLES

Note that the present disclosure is not limited to the exemplary embodiments described above, and modifications, improvements, and the like within the scope in which the object of the present disclosure can be achieved are included in the present disclosure.

Modification Example 1

In the exemplary embodiments described above, the spectrum calculation unit 242 calculates the signal value of each wavelength in each pixel (each region) as an optical spectrum, however the calculation is not limited thereto. For example, an absorption spectrum indicating an optical absorption rate with respect to each wavelength in each pixel may be calculated, or a reflectance spectrum may be calculated.

Modification Example 2

The color set unit 244 converts the feature wavelength in each pixel into the angle in the angle range Cr of 270 degrees or smaller in the hue circle, however the conversion is not limited thereto.

In other words, it is only required to set the angle range Cr so that the pixel with the maximum feature wavelength and the pixel with the minimum feature wavelength have colors that can be clearly distinguished from each other in the feature detection image. For example, in the hue circle in CIE 1976 L*a*b* color system, the hue angle of 0 degree and the hue angle of 360 degrees are substantially the same red. The hue angle of 30 degrees is orange, which can be distinguished from red. Therefore, the angle range Cr may be a range of 330 degrees from the minimum angle of 30 degrees to the maximum angle of 360 degrees. Note that, as in the exemplary embodiments described above, the angle range is set to 270 degrees or smaller. With this, the hue corresponding to the minimum angle $c_m$ and the hue corresponding to the maximum angle $c_M$ can be securely distinguished from each other with a human sight. The pixel with the maximum feature wavelength and the pixel with the minimum feature wavelength can be prevented from being inconveniently regarded as the same feature.

Modification Example 3

In the third exemplary embodiment, an example is described in which the feature wavelength detection unit 243 detects two feature wavelengths from an optical spectrum in each pixel, however, three or more feature wavelengths may be detected. For example, when the feature wavelength detection unit 243 detects the n feature wavelengths based on three features, the color set unit 244 only needs to calculate the straight line l based on the feature points P corresponding to the respective pixels plotted in the three-dimensional space, and convert each of the projection points Q into the angle in the hue circle in accordance with the positions of the projection points Q obtained by projecting the feature points P on the straight line l.

Modification Example 4

In the example described in the third exemplary embodiment, the color set unit 244 calculates a straight line on which dispersion of the projection points Q is maximized as the straight line l based on the feature points P, by using the main component analysis method, however the calculation is not limited thereto. For example, the straight line l based on the feature points P may be a regression straight line, which is obtained by the least-squares method, based on each of the feature points P. A straight line parallel to the straight line on which dispersion of the projection points Q is maximized, or a straight line parallel to the regression straight line may be adopted.

Modification Example 5

In the exemplary embodiments described above, the feature wavelength detection unit 243 detects the feature wavelength, based on the secondary differential waveform of the optical spectrum, however, the detection is not limited thereto. For example, the primary differential waveform of the optical spectrum may be used to detect a zero-cross point. A higher order differential waveform that is a tertiary or higher order differential waveform may be used to detect more detailed features. When the feature wavelength can be detected from the form of the optical spectrum, a differential waveform need not be used.

What is claimed is:

1. An information processing device comprising:
   a spectroscopic camera configured to acquire a plurality of spectroscopic images for a plurality of spectral wavelengths as a captured image of an imaging target;
   a memory configured to store a program; and
   a processor configured to execute the program so as to:
   calculate an optical spectrum in each of pixels, based on the plurality of spectroscopic images;
   detect a feature wavelength corresponding to a predetermined feature condition of the optical spectrum in each of the pixels;
   calculate a feature angle corresponding to the feature wavelength in each of the pixels when a spectral wavelength range including the plurality of spectral wavelengths that is allocated to a predetermined angle range of a hue circle;
   set, as a feature color of a corresponding pixel, a color in the hue circle corresponding to the feature angle; and;
   generate a feature detection image obtained by converting each of the pixels of the captured image into the feature color corresponding to the pixel;
   detect n feature wavelengths corresponding to n feature conditions in each of the pixels; and
   calculate the feature angle based on each projection point obtained by projecting feature points on a straight line, the straight line being obtained based on the feature points corresponding to the feature wavelength in each of the pixels and being plotted in an n-dimensional space having each of the n feature conditions as an axis.

2. The information processing device according to claim 1, wherein
   the predetermined angle range of the hue circle is 270 degrees or smaller.

3. The information processing device according to claim 1, wherein
   the processor is further configured to set the feature color, with a shortest wavelength in the spectral wavelength range as a minimum angle in the predetermined angle range, and with a longest wavelength in the spectral wavelength range as a maximum angle in the predetermined angle range.

4. The information processing device according to claim 1, wherein
   the processor is further configured to set the feature color, with a shortest feature wavelength, of the feature wavelengths detected in a plurality of the pixels, as a minimum angle in the predetermined angle range, and with a longest feature wavelength as a maximum angle in the predetermined angle range.

5. The information processing device according to claim 1, wherein
   the straight line is a straight line in which dispersion of the projection points corresponding to the feature points is maximized.

6. The information processing device according to claim 1, wherein
   the processor is further configured to set the feature color, with one of two points most separated away from each other on the straight line as a minimum angle in the predetermined angle range and the other one as a maximum angle in the predetermined angle range.

7. The information processing device according to claim 1, wherein
   the processor is further configured to detect the feature wavelength, based on a secondary differential waveform of the optical spectrum in each of the pixels.

8. An information processing system comprising:
   the information processing device according to claim 1; and
   the spectroscopic camera configured to image the captured image including the plurality of spectroscopic images of the imaging target.

9. An information processing method for causing one or a plurality of processors to process image information, the information processing method causing the one or plurality of processors to execute:
   acquiring a plurality of spectroscopic images for a plurality of spectral wavelengths as a captured image of an imaging target;
   calculating an optical spectrum in each of pixels, based on the plurality of spectroscopic images;
   detecting a feature wavelength corresponding to a predetermined feature condition of the optical spectrum in each of the pixels;
   calculating a feature angle corresponding to the feature wavelength in each of the pixels when a spectral wavelength range including the plurality of spectral wavelengths that is allocated to a predetermined angle range of a hue circle;
   setting, as a feature color of a corresponding pixel, a color in the hue circle corresponding to the feature angle;
   generating a feature detection image obtained by converting each of the pixels of the captured image into the feature color corresponding to the pixel;
   detecting n feature wavelengths corresponding to n feature conditions in each of the pixels; and
   calculating the feature angle based on each projection point obtained by projecting feature points on a straight line, the straight line being obtained based on the feature points corresponding to the feature wavelength in each of the pixels and being plotted in an n-dimensional space having each of the n feature conditions as an axis.

* * * * *